United States Patent
Buckland

[11] Patent Number: 5,548,580
[45] Date of Patent: Aug. 20, 1996

[54] METHOD AND APARATUS FOR RECOVERING A VARIABLE BIT RATE SERVICE CLOCK

[75] Inventor: Kenneth M. Buckland, Burnaby, Canada

[73] Assignee: PMC-Sierra, Inc., B.C., Canada

[21] Appl. No.: 350,550

[22] Filed: Dec. 7, 1994

[51] Int. Cl.⁶ .................................. H04J 1/16; H04J 3/14
[52] U.S. Cl. ............................ 370/17; 370/60.1; 370/84; 370/94.2
[58] Field of Search .................... 370/13, 17, 60.1, 370/61, 77, 79, 82, 84, 94.1, 94.2, 105.1, 105.3, 109, 60; 375/324, 325, 326, 327, 359, 371, 373

[56] References Cited

U.S. PATENT DOCUMENTS

| | | | |
|---|---|---|---|
| 5,115,429 | 5/1992 | Hluchyj et al. | 370/84 |
| 5,117,417 | 5/1992 | Danner | 370/84 |
| 5,132,966 | 7/1992 | Hayano et al. | 370/94.1 |
| 5,274,625 | 12/1993 | Derby et al. | 370/17 |
| 5,276,676 | 1/1994 | Horn et al. | 370/17 |
| 5,295,135 | 3/1994 | Kammerl | 370/17 |

OTHER PUBLICATIONS

Paper presented at ATM Form Technical Committee SAA Sub-Working Group on Apr. 20, 1994, by Guido Franceschini.

Primary Examiner—Alpus H. Hsu
Assistant Examiner—Ricky Q. Ngo
Attorney, Agent, or Firm—Myers, Liniak & Berenato

[57] ABSTRACT

A method of converting a variable bit rate of a transmitted sequence of cells having F cells per frame and a peak cell transmission rate P into an effective peak rate of transmitted cells for each frame. The steps include determining a number of ghost cells for each frame which when added to the actual number of cells in each such frame produce a peak rate of cells for that frame and transmitting in cells of a subsequent frame a number corresponding to the number of ghost cells determined for the preceding frame.

17 Claims, 2 Drawing Sheets

METHOD AND APARATUS FOR RECOVERING A VARIABLE BIT RATE SERVICE CLOCK

FIELD

The present invention relates to a method and apparatus for recovering a variable bit rate service clock from cells arriving with a variable delay and no average cell rate except over the long term. The method and apparatus has particular applications in an ATM cell format.

BACKGROUND

Currently the approach to transferring continuous bit rate services across an ATM (Asynchronous Transfer Mode) network is to use continuous bit rate cell streams. Such streams are transferred through the ATM relying on an Adaptive Clock method to smooth the network jitter. However, there is needed a method and apparatus to transfer variable bit rate (VBR) services across an ATM network as well as other types of networks. The approach to transporting variable bit-rate (VBR) services has not been fully defined. The main problem is in the recovery of the variable bit rate service clock. The suggested approaches to date involve explicit source clock state references being passed through the ATM network to a point where the service clock is being recovered. This information is used by a phase lock loop at that point to adaptively recover the clock by tuning the phase lock loop to the clock state references. However, such methods have not provided a satisfactory solution. A desired solution is one which does not involve the complexity of having to pass source clock state references through the ATM network. In a paper published by Guido Franceschini on Apr. 20, 1994 and distributed to the ATM Forum SAA Sub working group, an adaptive clock involving a 1 bit wide first-in first-out buffer (FIFO) and a phase lock loop was described as an appropriate method for an adaptive clock recovery method for a continuous bit rate stream. However, the difficulty with applying this approach to VBR service transport is that the cell rate across an arbitrary sequential group of cells can vary to such an extent that the phase lock loop circuit would not be able to lock. To get around this problem the latter reference suggested transferring the measure of the inter arrival times (at the sending side) with reference to an absolute counter implying that such a circuit would not work without transferring such information.

Accordingly it is an object of the invention to provide an improved method and apparatus for variable bit rate service clock recovery. It is a further object of the invention to provide a recovery method and apparatus for a variable bit rate service clock which does not require transferring rate information from the sending end.

SUMMARY OF THE INVENTION

According to the invention there is provided a method of converting a variable bit rate cell stream being transmitted through an ATM network having a fixed number, F, of cells per frame and a peak cell transmission rate P, which equals F divided by the time equal to the shortest time for F cells to pass a given point, into an effective peak rate, $P_{eff}$, transmitted cells for each frame. The steps include determining a number of ghost cells for each frame which when carried through the ATM network and counted at a receiving end together with the F cells per frame, makes the effective peak cell transmission rate equal to P and carrying in cells of a subsequent frame a number corresponding to the number of ghost cells determined for the preceding frame wherein a ghost cell is a virtual cell represented by bits in the first byte of an ATM Adaptation Layer 1 cell payload.

Advantageously the method may include transmitting a scaling factor Z relating the frequency of the recovered service clock, $f_{rec}$ to the peak cell rate P, by the formula $F_{rec}=P(1+Z)$.

The number of ghost cells required for a given frame is determined by counting a frame of cells and concurrently counting cells that would be transmitted at the peak cell rate for the time it takes to count the frame of cells and subtracting from the latter count the number of cells in a frame to obtain the required number of ghost cells, G.

The number of ghost cells may be transmitted in the actual cells with the most significant bit being placed in the first such cell of a frame subsequent to the frame to which G corresponds.

Preferably, the cells are asynchronous transfer mode or ATM cells.

In another aspect of the invention there is provided a method of transmitting across a network cells arriving at a variable bit rate but clocked at a service clock frequency $f_{eeg}$, and with a peak cell rate, P, related to the service clock frequency by the formula $f_{seg}=376P/k$, where k, the utilization ration, is the ratio between the peak bit rate and the service clock frequency, which includes establishing a frame, F, being a number into which the arriving cells are grouped successively; determining a number of ghost cells, G, for each frame which when carried through the ATM network and counted at a receiving end together with the F cells per frame, makes the effective peak cell transmission rate equal to P and transmitting the arriving cells and the ghost cell number for each frame across the network to a reassembly point. At the reassembly point the steps include creating sequences of bits having '1''s and '0''s with one sequence for each arriving cell and the number of sequences equal to the required number of ghost cells, loading the sequences serially into a first-in first-out buffer; and maintaining a predetermined fill level of the buffer using a phase lock loop so as to produce a recovered service clock rate.

In yet another aspect of the invention there is provided an apparatus for converting a variable bit rate of a transmitted sequence of cells having F cells per frame and a peak cell transmission rate P into an effective peak rate of transmitted cells for each frame. The apparatus has means for determining a number of ghost cells for each frame which when carried through the ATM network and counted at a receiving end together with the F cells per frame, makes the effective peak cell transmission rate equal to P; and means for carrying in cells of a subsequent frame a number corresponding to the number of ghost cells determined for the preceding frame.

Preferably the apparatus includes means for transmitting a scaling factor Z relating the frequency of the recovered service clock to the peak cell rate.

The recovered service clock frequency may equal (1+Z) times the peak cell rate, P, where Z is the scaling factor.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
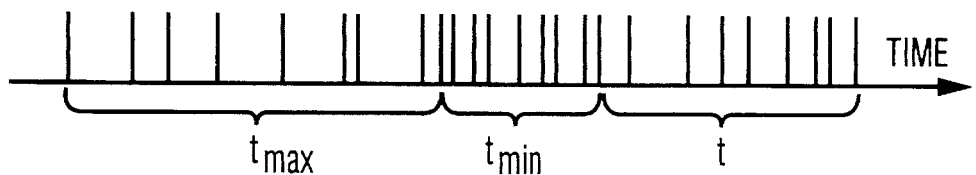
FIG. 1 is an example of a variable bit rate sequence of cells.

Referring to FIG. 1 there is shown three frames of a variable bit rate (VBR) sequence of cells in which there are eight cells per frame. The frame of cells to the left (the first one) takes the longest time $t_{max}$ to pass while the one in the center (the second one) takes the shortest time $t_{min}$. The cells in the right hand frame (the last one) take an intermediate time t to pass where $t_{min}<t<t_{max}$. If F is taken as the number of cells per frame (in this case 8) each frame ends with the arrival of cell number F+1. The cells in the second frame are passing at the peak rate, P given by:

$$P = F/t_{min} \qquad 1)$$

The cells in the first frame pass at the ebb rate, E given by:

$$E = F/t_{max} \qquad 2)$$

The cells in the last frame pass during an intermediate time period t in the range of $t_{min}<t<t_{max}$.

Considering that a phase lock loop would be prevented from locking due to the variance between P and E, by sending additional ghost cells to drive the rate up to P, one can avoid the problem due to the large variance between the ebb rate, E, and the peak rate, P, thereby preventing lock up of the phase lock loop. In fact, considering that the phase lock loop circuit is located on the receiving end of the network, it is not necessary to transmit actual cells but merely numbers that correspond to the number of such ghost cells in each frame of cells. To determine the number of desired ghost cells, D, that should be sent in every frame of F cells, the overall cell rate of that frame should be made to match the peak rate, P. The peak rate is determined by the sending end of the network and is a constant fraction of the peak bit rate which will normally be less than the service clock rate. There must also be provision for transmitting from the sending end to the receiving end a value which will define the correspondence between the service clock rate and the peak rate. The condition of adding a sufficient number of ghost cells, D, to match the peak rate, P, gives the following:

$$(F+D)/t = F/t_{min} \qquad 3)$$

Thus, D becomes $$D = F(t/t_{min} - 1) \qquad 4)$$

If $t/t_{min}$ is not an integer, D will not be an integer. Thus, equation 4 should be truncated for ready representation in the bits of the cell stream. The number of actual ghost cells, G, after such truncation is given by the following:

$$G = \text{truncate } (D+R) \qquad 5)$$

where R is the residual, non-integer portion of the desired number of ghost cells for the last frame of cells. This value of R is not represented in the number of ghost cells computed for the last frame of cells. A new residual, R', is calculated every frame using the residual, R, for the last frame according to the following:

$$R' = D + R - G \qquad 6)$$

Equations 4, 5, and 6 are used in on-going calculations to calculate the number of ghost cells, G, to be represented and passed to the reassembly circuitry.

Figure 2:
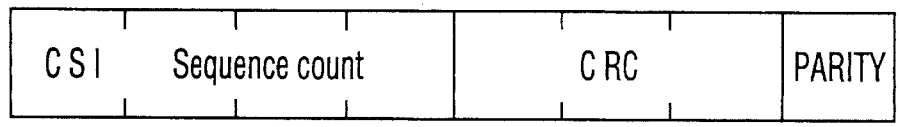
FIG. 2 is a schematic diagram of the first byte of an AAL1 cell.

Currently, in ATM systems, ATM Adaptation Layer 1 (AAL1) is employed to transport services with a continuous bit-rate (CBR) across the ATM network. In the AAL1 cell format the first byte of the cell payload, (called the AAL1 byte) as shown in FIG. 2, is used to define characteristics unique to AAL1. The first 4 bits define a sequence number and consist of a first bit which is the convergence sub layer indicator (CSI) and three subsequent bits which are the sequence count. The remaining four bits are the sequence number protection (SNP) and consist of three cyclical redundancy check (CRC) bits. The last bit is a parity bit. The SNP bits protect the first four SN bits. The other 47 bytes of the payload are used for service data.

Since a modulo eight count is made in the AAL1 byte, a corresponding 8 cell frame would typically be used for VBR clock recovery. If all 8 CSI bits of the 8 cells in a frame are used for ghost cell representation in each frame, F is 8 and the maximum number of ghost cells that can be represented per frame are M=255. At the sending end if the number of ghost cells calculated as being required for that frame were to be transmitted, it would be necessary to delay the transmission of the cells in that frame until the final calculation was completed. Rather than suffering such a delay, the number of ghost cells for each frame is indicated in the subsequent frame. It will be appreciated that there is no need to transmit additional cells to represent ghost cells. One merely has to insert a number corresponding to the number of ghost cells. In this case the number is inserted into the CSI bits of the cells in a frame. The most significant bit is loaded into the CSI bit of the first cell of a frame and the lesser significant bits into the CSI bits of the subsequent cells in the frame in order of most significant to least significant. This allows the maximum amount of information to reach the receiving end first.

If for every frame of F cells, a maximum of M ghost cells can be represented due to limitations on the bits of the AAL1 byte available for representation, the peak rate, P, is given by $$F/t_{min} = (F+M)/t_{max} \qquad 7)$$

$$t_{max} = (1+M/F)t_{min} \qquad 8)$$

But from equations 1 and 2 it follows that $$Pt_{min} = Et_{max} \qquad 9)$$

Combining equations 8 and 9 gives the following:

$$P/E = (1+M/F) \qquad 10)$$

The peak-to-ebb ratio, P/E, defines the nature of the VBR cell streams which can be successfully transported using this approach. It is a function of the number of cells F per frame and the maximum number of ghost cells, M, which can be represented per frame.

In practice, since most VBR services have a readily identifiable peak rate, this approach normally requires the determination of constraints that, if met, ensure that the corresponding ebb rate is maintained. In these cases t can never be allowed to exceed $t_{max}$, where $t_{max}$ can be determined by combining equations 1 and 8 as follows:

$$t_{max}=(F+M)/P \qquad 11)$$

If t approaches $t_{max}$, a possible variant of this clock recovery method could be one that generates empty cells to prevent t from exceeding $t_{max}$.

One difficulty that arises is that of requiring a $t_{max}$ limit over a frame of F cells. This limit can be satisfied when F−1 cells with very small delays and one cell with a very large delay have a combined delay of less than $t_{max}$. The problem with this occurrence is that if the boundaries of the frames were to be altered, two large delay cells from previously separate frames could occur in the same frame, leading to a violation of $t_{max}$. A solution is to require that $t_{cellmax}$ be adhered to on a cell-by-cell basis, where $t_{cellmax}$ is given by the following:

$$t_{cellmax}=t_{min}/F=1/(E+EM/F) \qquad 12)$$

All of the analysis presented above for VBR services where peak rate is easily determined can be reworked for services where ebb rate is more easily determined. In these cases a value for $t_{cellmin}$ can be calculated that defines how quickly cells can arrive. This value as defined below can be used for smoothing or policing:

$$t_{cellmin}=t_{min}/F=1/(E+EM/F) \qquad 13)$$

Figure 3:
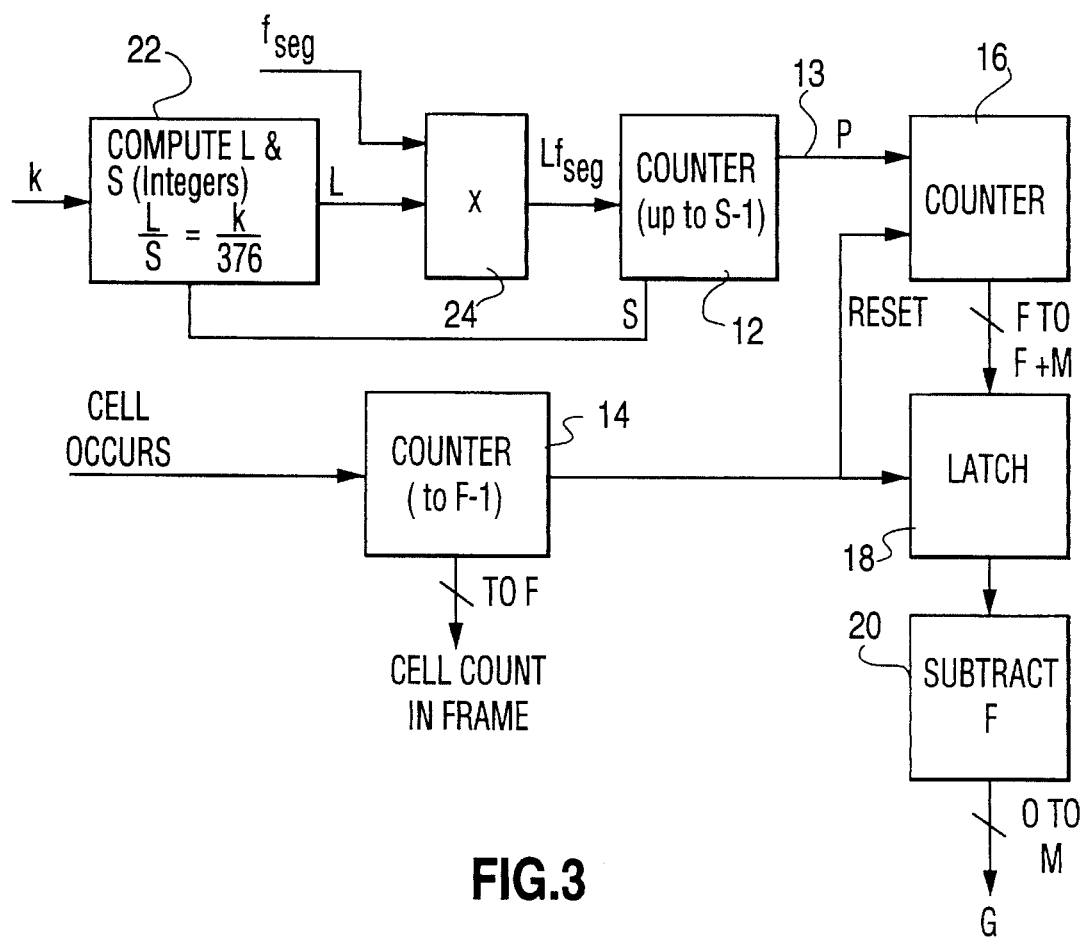
FIG. 3 is a schematic diagram of a circuit which determines the number G of ghost cell to be sent in each frame.

The circuit used to calculate the number of ghost cells G per frame in combination with the adaptive clock recovery first-in first-out buffer circuit is shown in FIG. 3. In this case a logic circuit 22 computes integral values of arbitrary numbers "L" and "S" where k/376=L/S. The value of L is fed into one input of a multiplier circuit 24 and fseg into the other. The product Lfseg is input to a counter 12 which counts up to S−1 and then outputs a bit corresponding to the peak cell rate, P, on line 13. Line 13 forms the input to a counter 16. Counter 14 has as its input the actual cells and counts up to the frame count (normally 8) less 1 and then sends a bit both to reset counter 16 and to cause latch 18 to latch the count from the output of counter 16. The latter output is a word having a value from F to F+M with the number of bits available at the output of counter 16 to represent this value being $\log_2 (F+M+1)+1$. The output from latch circuit 18 is sent to a logic circuit 20 which subtracts F from the output of counter 16. The resulting number is G which is the output of logic circuit 20.

Figure 4:
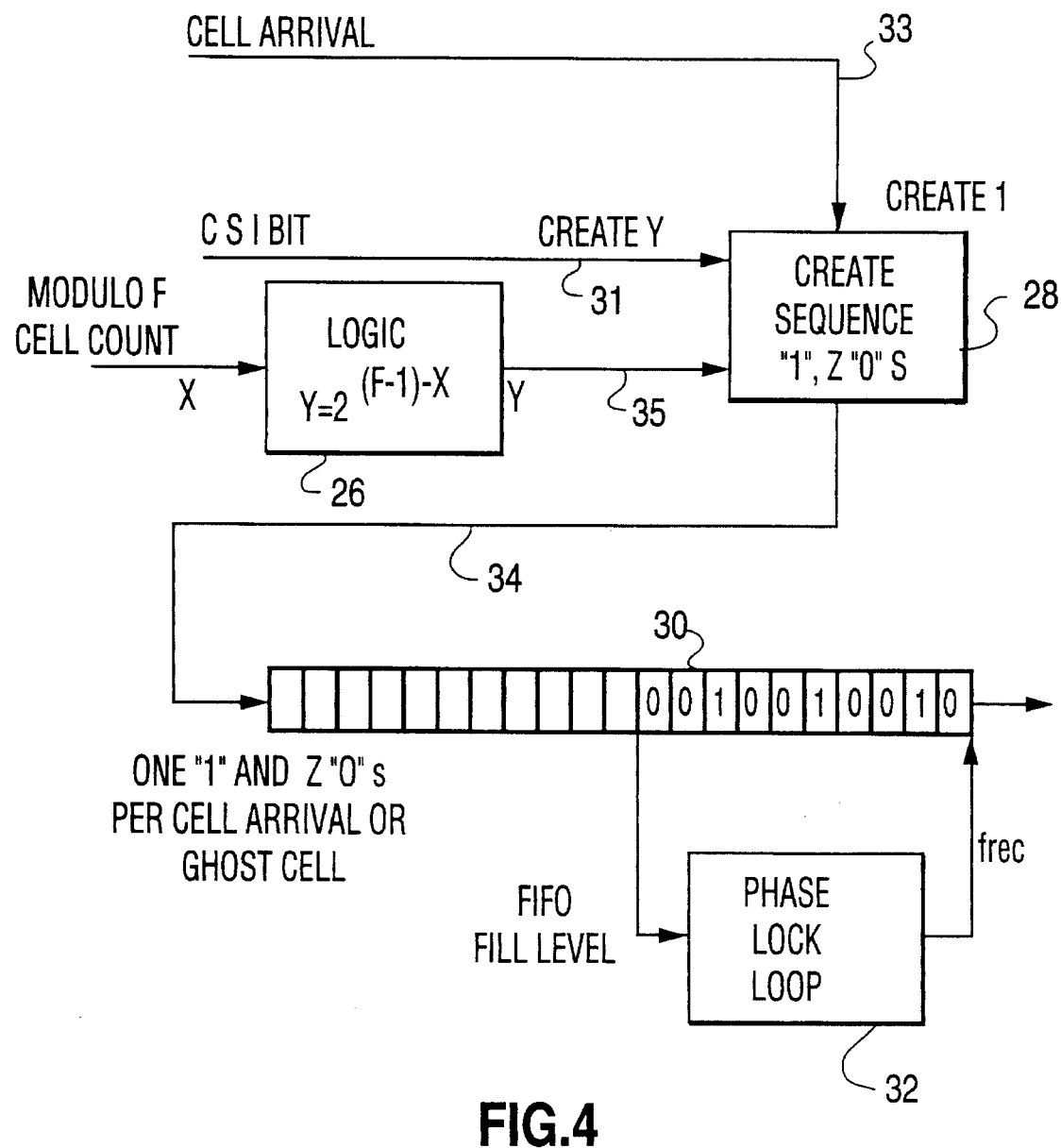
FIG. 4 is a schematic diagram showing the circuit for loading a number sequence corresponding to cells into an adaptive clock recovery first-in first-out buffer.

Referring to FIG. 4 the adaptive clock recovery circuit is shown as consisting of a first-in first-out buffer (FIFO) 30 with a phase lock loop circuit 32 tuned to the level of fullness of the FIFO 30. Bits arrive at one end and are clocked out at the other. Every time a cell arrives a single "1" and an arbitrary number of "0"s, Z, are loaded into the FIFO 30. The clock recovered by the PLL 32 is used to clock out both the contents of the FIFO 30 and the AAL1 cell payloads. Increasing the number of "0"s, Z, increases the recovered clock rate. In this case the relationship between the recovered service clock and the peak cell rate P is given by the following:

$$f_{rec}=P(1+Z) \qquad 14)$$

The receiving or reassembly point can be informed of Z during call connection, or Z can be made constant for all VBR applications. In the former case this information is all that the clock recovery circuitry need ever be sent, aside from that contained in the AAL1 byte of the cells themselves.

At the sending end or segmentation point, the service clock frequency is inconsequential because it is the peak bit rate of the service which determines the peak cell rate P used by the clock recovery approach, and that peak bit rate can have any value up to the service clock frequency. The relationship between the service clock frequency and the peak cell rate is given by the following:

$$f_{seg}=376\ P/k \qquad 15)$$

where k is a utilization ratio with a value between 0 and 1, which indicates the ratio between the peak bit rate and the service clock frequency.

The service clock frequency is better ignored at the segmentation point because if it is used to determine the peak cell rate and it is higher than the peak bit rate, the required ebb rate E will be unnecessarily increased by a factor of 1/k, and $t_{cellmax}$ will be corresponding reduced by a factor of k. To match the recovered service clock frequency $f_{rec}$ with the service clock frequency at the segmentation point, $f_{seg}$, Z should be set as an integral value determined from the following:

$$Z=376/k-1 \qquad 16)$$

In FIG. 4, a modulo F cell count X, i.e. a count beginning at "0" and going up to "7", is applied as X to a logic circuit 26 which computes the value of $Y=2^{(F-1)-X}$ for each value of X, and outputs Y on line 35 to a create sequence block 28. A cell arrival line 33 forms a Create "1" input to block 28 while a CSI bit input on line 31 forms a Create Y input. The initial value from logic circuit 26 would be $2^7$. When F is 8 (normally the case), the initial value from logic circuit 26 would be $2^7$. The presence of a non-zero CSI bit would cause block 28 to create $2^7=128$ sequences of a single "1" and Z "0"s each of which are loaded onto line 34 and input to FIFO buffer 30. If only a cell arrives and no non-zero CSI bit then block 28 creates only a single sequence of a single "1" and Z "0"s which feed into FIFO buffer 30 on line 34. The subsequent value from logic circuit 26 would be $2^6=64$. This would cause 64 sequences of a single "1" and Z "0"s to be output on line 34 for a non-zero CSI bit. The process would be repeated until the last value of Y from circuit 26 would be unity.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

I claim:

1. A method of converting a variable bit rate cell stream being transmitted through an ATM network having a fixed number, F, of cells per frame and a peak cell transmission rate, P, which equals F divided by the time equal to the shortest time for F cells to pass a given point, into an effective constant rate, $P_{eff}$, of transmitted cells for each frame equal to the peak rate, P, comprising:

(a) determining a number, G, of ghost cells for each frame which, when carried through the ATM network and counted at a receiving end together with the F cells per frame, makes the effective peak cell transmission rate equal to P; and (b) carrying in cells of a subsequent frame a number corresponding to the number of ghost cells determined for the preceding frame, wherein a ghost cell is a virtual cell represented by bits in the first byte of an ATM Adaptation Layer 1 cell payload.

2. A method according to claim 1, including transmitting a scaling factor Z which relates the frequency of the recovered service clock, $f_{rec}$, to the peak cell rate, P, by the formula $f_{rec}=P(1+Z)$.

3. A method according to claim 1, wherein the number of ghost cells required for a given frame is determined by counting a frame of cells and concurrently counting cells that would be transmitted at the peak cell rate for the time it takes to count the frame of cells and subtracting from the latter count the number of cells in a frame to obtain the required number of ghost cells, G.

4. A method according to claim 3, wherein the number of ghost cells is transmitted in the actual cells with the most significant bit being placed in the first such cell of a subsequent frame to the frame to which G corresponds.

5. A method according to claim 1, wherein the cells are asynchronous transfer mode or ATM cells.

6. A method of transmitting across a network cells arriving at a variable bit rate but clocked at a service clock frequency. $f_{seg}$, and with a peak cell rate. P, related to the service clock frequency by the formula $f_{seg}=376\,P/k$ where k, the utilization ratio, is the ratio between the peak cell rate and the service clock frequency, comprising:

(a) establishing a frame, F, being a number into which the arriving cells are grouped successively;

(b) determining a number of ghost cells, G, for each frame which when carried through the ATM network and counted at a receiving end together with the F cells per frame, makes the effective peak cell transmission rate equal to P;

(c) transmitting the arriving cells and the ghost cell number for each frame across the network to a reassembly point;

(d) creating sequences of bits having 1's and 0's with one sequence for each arriving cell and a number of said sequences equal to the required number of ghost cells;

(e) loading said sequences serially into a first-in first-out buffer; and (f) maintaining a predetermined fill level of said buffer using a phase lock loop so as to produce a recovered service clock rate, wherein a ghost cell is a virtual cell represented by bits in the first byte of an ATM Adaptation Layer 1 cell payload.

7. A method according to claim 6, including transmitting in a bit location of each of said cells in a frame which is reserved for the ghost cell count a number corresponding to a bit representing the number of ghost cells, G, with the bits being loaded into the cells in order of most to least significant.

8. A method according to claim 6, wherein the arriving cells are asynchronous transfer mode (ATM) cells.

9. A method according to claim 8, including transmitting from the segmentation end to the receiving end a scaling factor Z relating the recovered service clock frequency and the peak cell rate.

10. A method according to claim 9, wherein the scaling factor Z is $(376/k)-1$ where k is the ratio between the peak bit rate and the service clock frequency.

11. A method according to claim 10, wherein the sequence is a single "1" and Z "0"s.

12. A method of recovering a variable bit rate service clock from a transmitted sequence of cells characterized in having a peak cell rate, P, comprising:

(a) loading at a segmentation point into cells a number corresponding to a number of ghost cells, G, necessary to bring the total number of cells in a frame up to the peak cell rate, P;

(b) transmitting said cells from the segmentation point to a reassembly point;

(c) transmitting from the segmentation point to the reassembly point a number related to the ratio between the peak cell rate and the service clock frequency; and (d) creating a sequence of token bits in response to each cell arrival and to the number of ghost cells in each frame and loading each sequence into a first-in first-out buffer of an adaptive clock recovery circuit having a phase lock loop monitoring the fullness of the buffer wherein the clock recovered by said phase lock loop is used to clock out from said buffer one bit per clock cycle, wherein a ghost cell is a virtual cell represented bits in the first byte of an ATM Adaptation Layer 1 cell payload.

13. Apparatus for converting a variable bit rate of a transmitted sequence of cells transmitted at a service clock frequency having F cells per frame and a peak cell transmission rate P into an effective peak rate of transmitted cells for each frame, comprising:

(a) means for determining a number of ghost cells for each frame which, when carried through the ATM network and counted at a receiving end together with the F cells per frame, makes the effective peak cell transmission rate equal to P; and (b) means for carrying in cells of a subsequent frame a number corresponding to the number of ghost cells determined for the preceding frame for use in deriving a recovered service clock freguency, wherein a ghost cell is a virtual cell represented by bits in the first byte of an ATM Adaptation Layer 1 cell payload.

14. Apparatus according to claim 13, wherein the recovered service clock frequency equals $(1+Z)$ times the peak cell rate, P, where Z is the scaling factor.

15. Apparatus according to claim 13, including means for counting the number of cells in a frame of cells, means for concurrently counting cells that would be transmitted at the peak cell rate for the time it takes to count the frame of cells and means for subtracting from the number of peak rate cells counted the number of frame cells counted so as to give the number of required ghost cells.

16. Apparatus according to claim 15, including means for transmitting the number of ghost cells in the actual cells with the most significant bit being placed in the first such cell of a frame subsequent to the frame to which G corresponds.

17. Apparatus according to claim 13, wherein the cells are asynchronous transfer mode or ATM cells.

* * * * *

UNITED STATES PATENT AND TRADEMARK OFFICE
CERTIFICATE OF CORRECTION

PATENT NO. : 5,548,580
DATED : August 20, 1996
INVENTOR(S) : Kenneth M. Buckland It is certified that error appears in the above-identified patent and that said Letters Patent is hereby corrected as shown below:

Title,
Please delete "APARATUS" and substitute -- APPARATUS --.

Column 5,
Formula 12, should read:

"$t_{collmax} = t_{max}/F = (1+M/F)/P$"

Signed and Sealed this

Twentieth Day of November, 2001

Attest:

NICHOLAS P. GODICI
Attesting Officer   Acting Director of the United States Patent and Trademark Office